US008966002B2

(12) United States Patent
Hong et al.

(10) Patent No.: US 8,966,002 B2
(45) Date of Patent: Feb. 24, 2015

(54) PROVIDING OF LINK INFORMATION BETWEEN VARIOUS APPLICATION INFORMATION AND USING THE LINK INFORMATION

(75) Inventors: Hotaek Hong, Seoul (KR); Youngin Kim, Seoul (KR); Chuhyun Seo, Seoul (KR); Joonhui Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 478 days.

(21) Appl. No.: 12/451,007

(22) PCT Filed: Apr. 21, 2008

(86) PCT No.: PCT/KR2008/002232
§ 371 (c)(1),
(2), (4) Date: Oct. 22, 2009

(87) PCT Pub. No.: WO2008/133420
PCT Pub. Date: Nov. 6, 2008

(65) Prior Publication Data
US 2010/0115030 A1 May 6, 2010

(30) Foreign Application Priority Data

Apr. 25, 2007 (KR) .................. 10-2007-0040269

(51) Int. Cl.
*G06F 15/16* (2006.01)
*G08G 1/09* (2006.01)
(Continued)

(52) U.S. Cl.
CPC ............... *G08G 1/092* (2013.01); *H04H 20/55* (2013.01); *H04H 20/93* (2013.01); *H04L 67/02* (2013.01)
USPC ............................ 709/217; 709/236; 709/250

(58) Field of Classification Search
USPC ............................................... 709/204
See application file for complete search history.

(56) References Cited

U.S. PATENT DOCUMENTS 5,551,020 A 8/1996 Flax et al.
6,766,327 B2 7/2004 White et al.
(Continued)

FOREIGN PATENT DOCUMENTS

EP 1 445 750 A2 8/2004
FR 2 873 481 A1 1/2006
(Continued)

OTHER PUBLICATIONS

Y. Jeong and W. Kim: A Novel TPEG Application for Location Based Service using Terrestial-DMB, Issue Date Feb. 2006, IEEE Consumer Electronics Society, vol. 52 Issue 1, pp. 281-286.*
(Continued)

*Primary Examiner* — Viet Vu
*Assistant Examiner* — Herman Belcher
(74) *Attorney, Agent, or Firm* — McKenna Long & Aldridge LLP

(57) ABSTRACT

The invention provides link information between various application information. One method according to the invention creates a first type of information to be provided through a first information service, creates link information specifying a second type of information associated with the first type of information within a second information service different from the first information service, creates a transfer message of the first information service including the first type of information and the link information, and provides the transfer message for a terminal. The user can then easily check associated information of the second information service if needed while he or she is using the first information service.

9 Claims, 13 Drawing Sheets

(51) Int. Cl.
*H04H 20/55* (2008.01)
*H04H 20/93* (2008.01)
*H04L 29/08* (2006.01)

(56) References Cited

U.S. PATENT DOCUMENTS

2001/0043584 A1    11/2001  Kersken et al.
2003/0102986 A1     6/2003  Hempel et al.
2004/0064507 A1*    4/2004  Sakata ........................ 709/205
2006/0106536 A1*    5/2006  Park ............................ 701/208
2006/0262662 A1*   11/2006  Jung et al. .................... 369/1
2006/0267794 A1*   11/2006  Lee et al. ..................... 340/905
2007/0155396 A1*    7/2007  Kim et al. .................... 455/453

FOREIGN PATENT DOCUMENTS

KR    10-2004-0093483    11/2004
KR    10-2006-0122669    11/2006

OTHER PUBLICATIONS

TPEG TEC Application Specification, Version 1.0. Mar. 9, 2006, Mobile.lnfo. WG Automotive Development Project.*

* cited by examiner

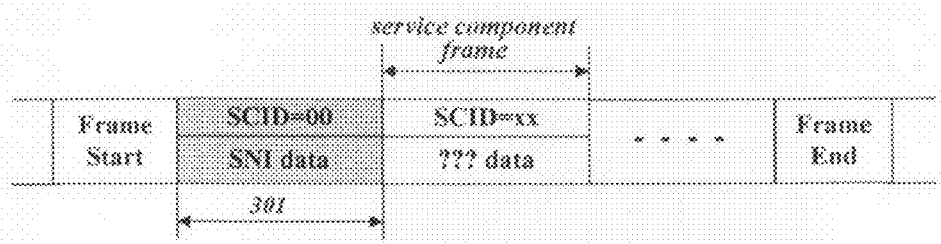

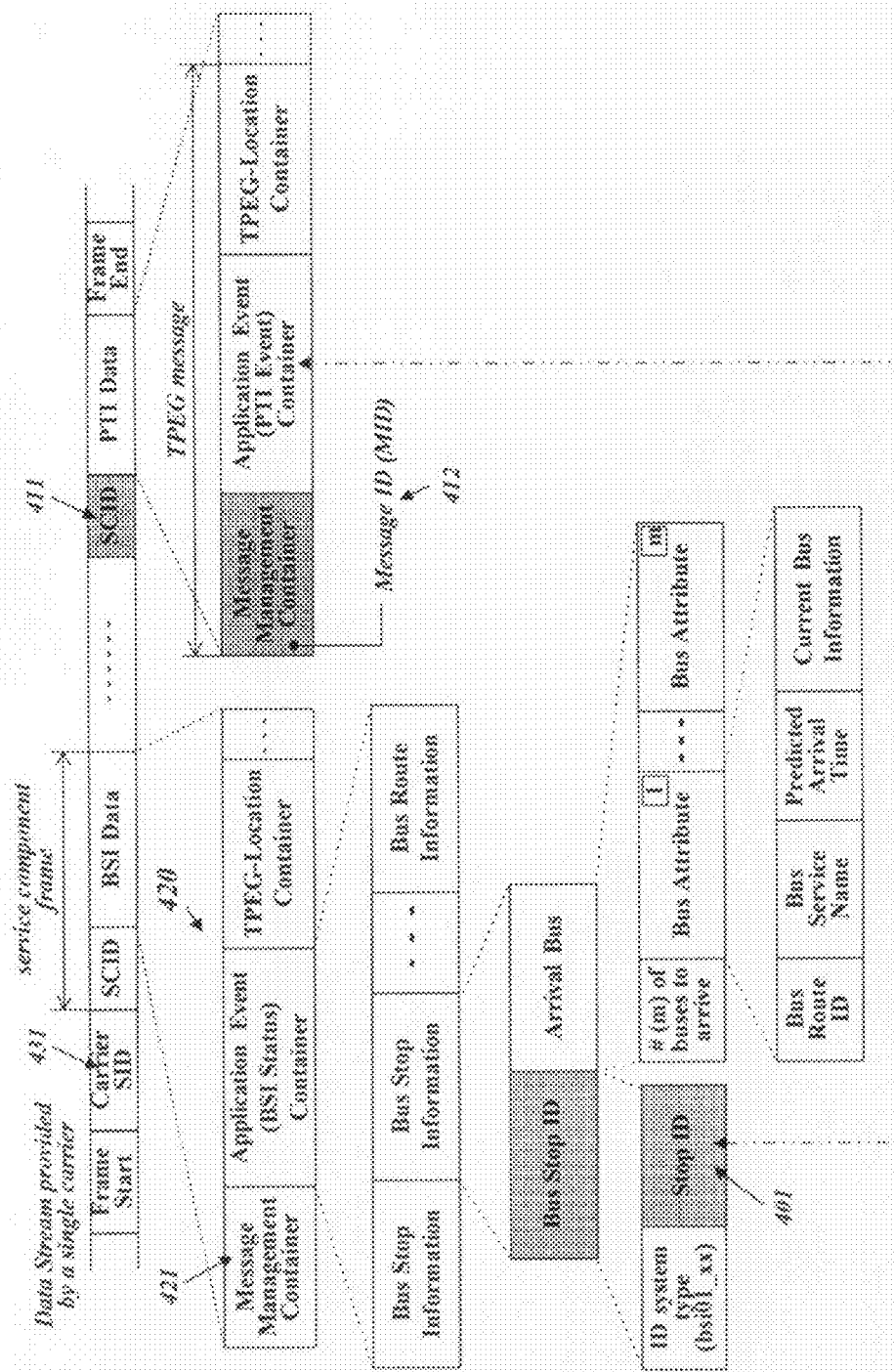

Figure 7

| AID (hex) | Application |
|---|---|
| 0000 | SNI: Service and Network Information Application |
| 0001 | RTM: Road Traffic Message Application |
| 0002 | PTI: Public Transport Information Application |
| 0003 | PKI: Parking Information Application |
| 0004 | CTT: Congestion and Travel Time Information Application |
| 0005 | TEC: Traffic Event Compact Application |
| 0006 | WRI: Weather Information Application |
| 0007 | CAI: Conditional Access Information Application |
| 0008 | IDI: Infrastructure Disturbance Information Application |
| 0009 | MBT: Multimedia Based TTI Application |
| 000A | BSI: Bus Service Information Application |
| 000B | SDI: Safety Driving Information Application |
| 000C | POI: Point Of Interest Application |
| 000D | NWS: News Service Application |

Figure 8

```
<Application_Link>:=         : Link Information to related service & message
<intunli>(aid),              : Application ID
<intunti>(scid),             : Service Component ID
<intunli>(mid);              : Message ID
```

Figure 9

```
<bsi_message> : =
<intunli>(mid),                    : Message identifier
<intunti>(ver),                    : Version number
<intunli>                          : Length, n, of message in bytes
<bitswitch>(selector),             : Message element
if(selector=xxxxxxx1)<time_t>,     : Message creation time
if(selector=xxxxxx1x)<intunlo>,    : Reserved for future use
if(selector=xxxxx1xx)<intunlo>,    : Reserved for future use
if(selector=xxxx1xxx)<intunlo>,    : Reserved for future use     ─ 601
if(selector=xxx1xxxx)<intunlo>,    : Reserved for future use
if(selector=xx1xxxxx)<intunlo>,    : Application Link information
if(selector=x1xxxxxx)<intunlo>,    : Reserved for future use
if(selector=1xxxxxxx)<bsi_components>, :
                                   Bus service information message component
```

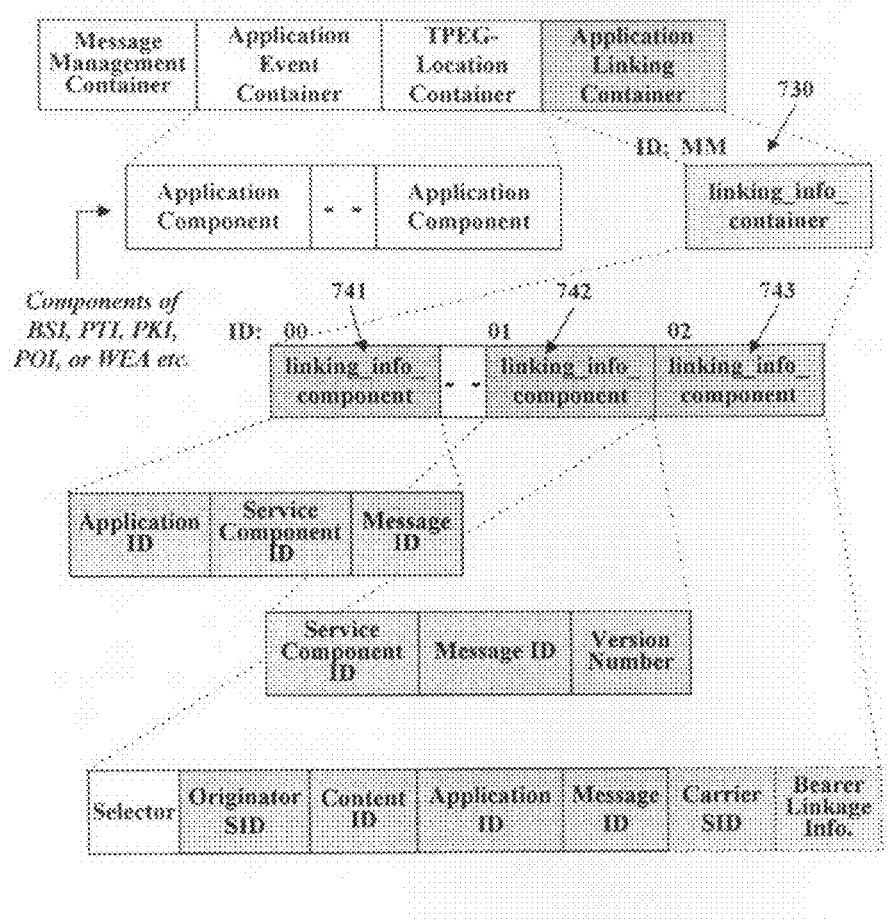

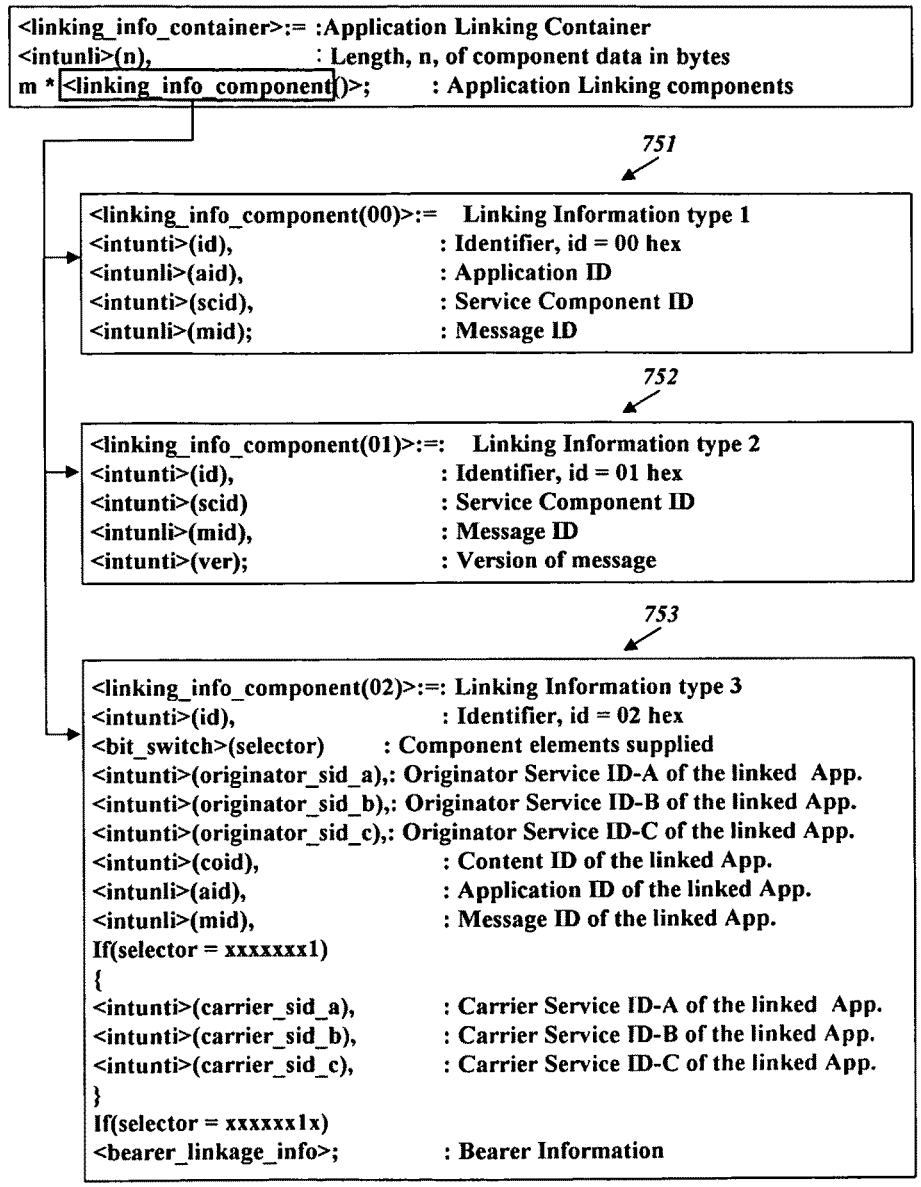

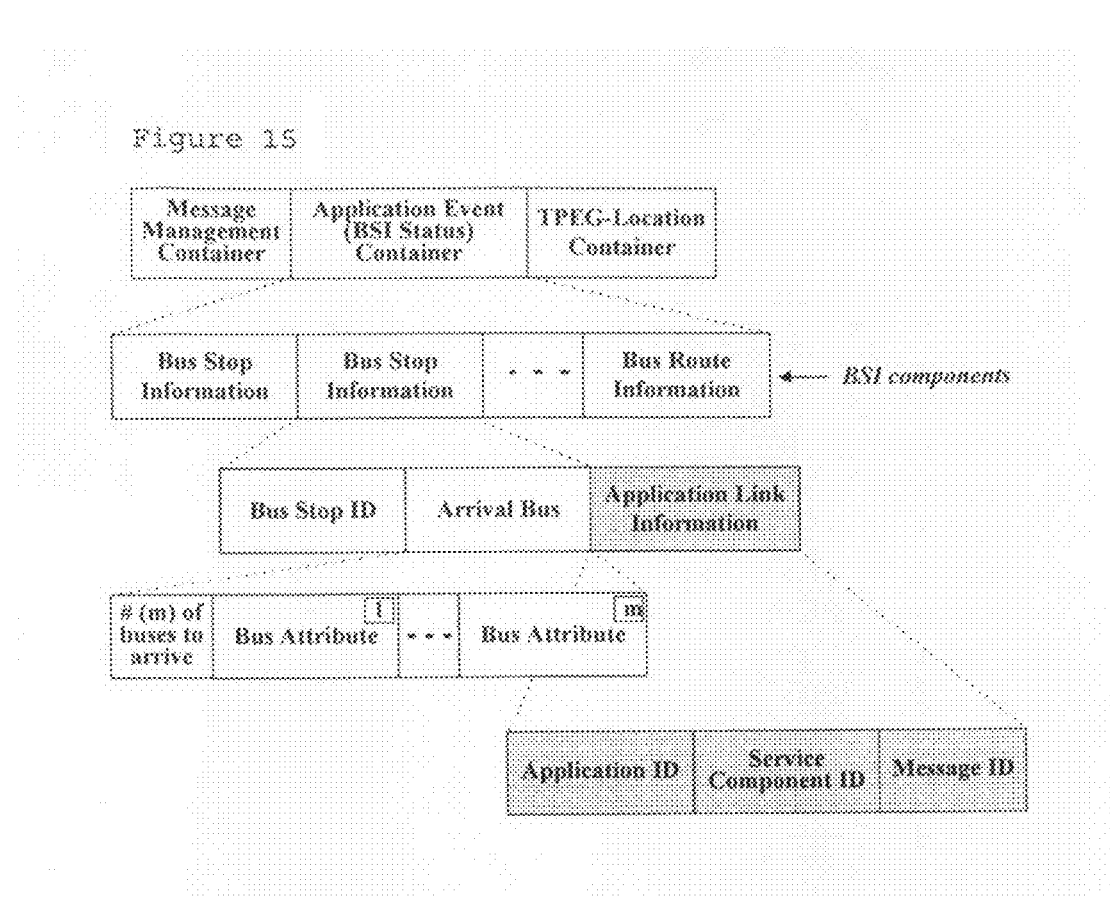

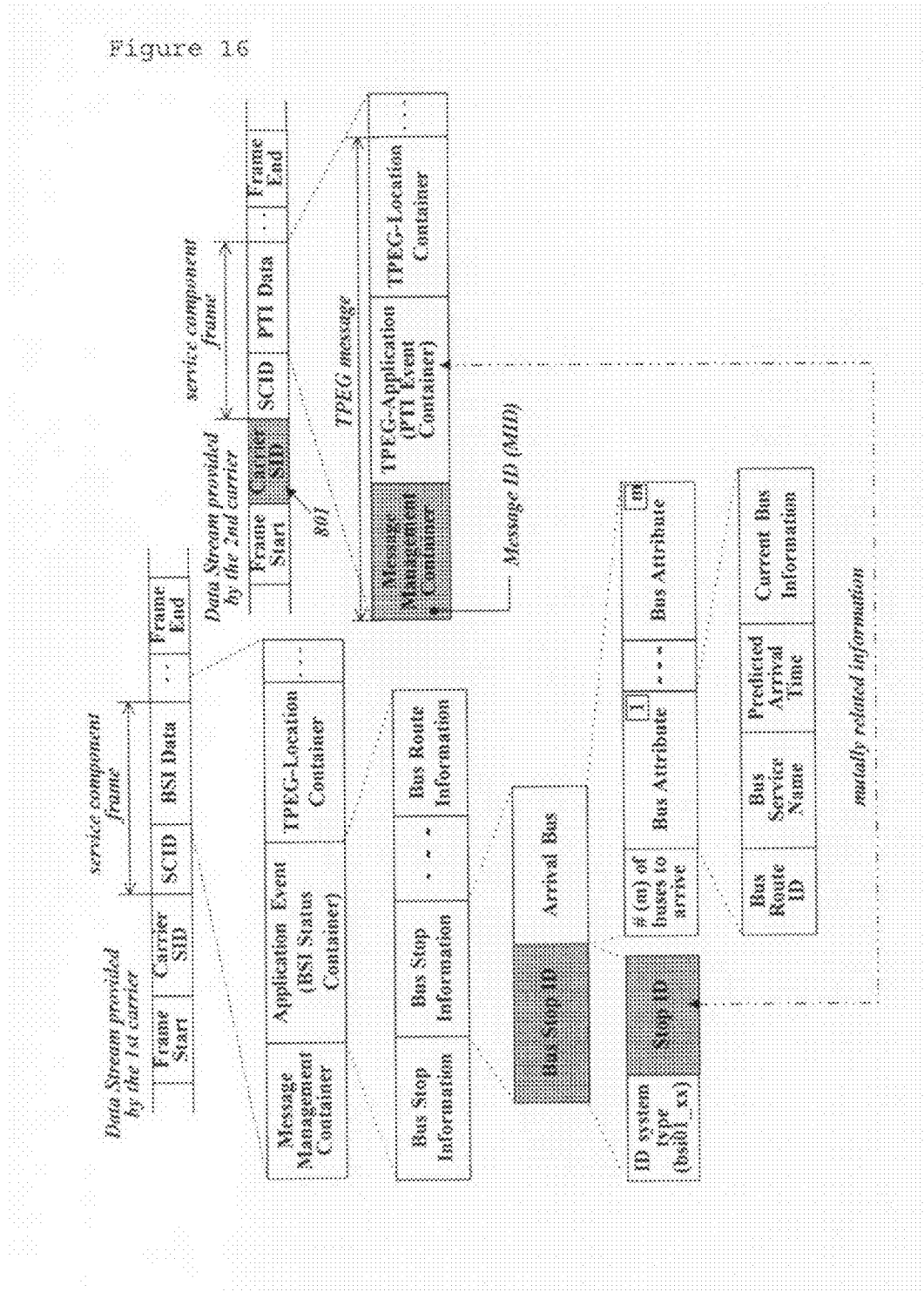

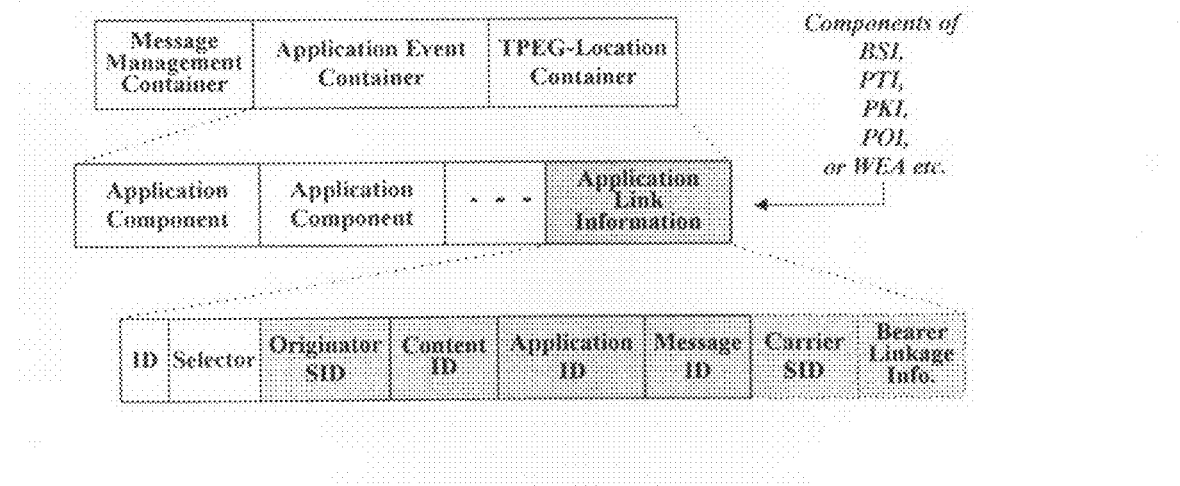

Figure 21

| Service (route) ID | Bus stop ID | Estimated travel time on link (min.) | Bus current location | Application Link |
|---|---|---|---|---|
| : | : | : | : | : |
| 504 | Youngmuon elementary school | 3 | Yes (1) | No (0) |
| 504 | Express bus terminal | 3 | No (0) | Yes (1): Link_Inf_1 |
| : | : | : | : | : |
| 9404 | On subway station | . | No (0) | No (0) |
| 9404 | Mikeum subway station | 3 | No (0) | No (0) |
| 9404 | Korea Telecom | 5 | pre-sect (2) | No (0) |
| : | : | : | : | : |

1201    1202    1203

PROVIDING OF LINK INFORMATION BETWEEN VARIOUS APPLICATION INFORMATION AND USING THE LINK INFORMATION

This application claims the benefit of Korean Patent Application No. 10-2007-0040269 filed on Apr. 25, 2007 and PCT Application No. PCT/KR2008/002232, filed on Apr. 21, 2008, which is hereby incorporated by reference for all purposes as if fully set forth herein.

TECHNICAL FIELD

This document is related to a method for providing various application information such as the information required for operation of public transportation service or car driving and using the provided information.

BACKGROUND ART

Due to recent advances in digital signal processing and communications technology, radio and TV broadcast signals are provided gradually in the form of digital data. As signals are provided in the form of digital data, a variety of information is now allowed to be added to TV or radio broadcast signals, the information including news, stock, weather, traffic, and so on.

In particular, necessity for traffic information and service information of public transportation means is constantly increasing with the increment of the number of vehicles in downtown areas, the number of vehicles during holidays, and so on. Accordingly, methods for providing traffic information or bus service information as auxiliary information via satellite, terrestrial broadcast, or mobile communication network are under development. Besides the above methods, a method for providing various application information, for example obstacle information on the road, parking information of a particular area, and the like is also being developed.

Such contents can be provided by different carriers (a carrier means an information transmitter) or by the same carrier. FIG. 1 illustrates a method for providing application information different from each other, for example CTT (Congestion & Travel-Time) information 10 and RTM (Road Traffic Message) information 11 through the same carrier; a data stream transmitted from a single carrier is transferred in such a way that each data frame included in the data stream includes one or more than one type of TPEG message. A service component identifier (SCID) is coded into each service component frame included in a single frame.

Accordingly, a terminal that decodes information organized as above and provided through a single carrier, to show traffic information on the road, uses information decoded from a TPEG-CTT message 10 and uses information decoded from a TPEG-RTM message 11 to show information about a road situation. To show different information, for example bus service information, a TPEG-BSI (Bus Service Information) message related thereto is used.

On the other hand, if the user tries to check parking information while using particular application information, for example congestion information on the road or tries to check service information of long distance transportation means (airplane, express bus, train, etc) while using bus service information, the user has to move from a current service screen on the terminal to a screen providing different service and also has to undergo a menu selection procedure based on a top-down scheme on the new service screen to get desired information. Also, even if the user undergoes the above selection procedure, it becomes cumbersome to find different information associated with particular information that the user has used before. For example, if the user checked service information about an express bus terminal or a bus terminal of an airport through bus service information and then tries to find additional information about express bus service information of the express bus terminal or the airport or airplane service information, the user has to stop using the current bus service information and connect to PTI service of a long distance transportation means to check the additional information (or information decoded from a decoding routine of the PTI service). As a matter of course, the user can know the desired information only after he or she has undergone a cumbersome procedure that requires choosing a desired express bus terminal or airport from the PTI service.

DISCLOSURE OF INVENTION

Technical Problem

One objective of the present invention is to provide a method and an apparatus for providing information linking various application information so that the user can know desired information faster and more conveniently.

Objectives of the present invention are not limited to those described above; those attainable from a specific and illustrative description of the present invention should necessarily be included in the above objective.

Technical Solution

One method for encoding application information according to the invention comprises creating a first type of information to be provided through a first information service, creating link information specifying a second type of information associated with the first type of information, the second type of information being within a second information service different from the first information service, and creating a transfer message comprising the first type of information and the link information.

One method of decoding application information according to the invention comprises extracting a transfer message from received signals, extracting a first type of information and link information from the extracted transfer message, and based on the extracted link information, searching for a second type of information within a second information service different from a first information service that services the first type of information.

In one embodiment according to the invention, the link information, if the first information service and the second information service are provided through the same carrier, comprises identifying information for specifying a service component frame within a data frame that the carrier transmits and identifying information of a transfer message carrying the associated second type of information. In one embodiment according to the invention, the link information further comprises a version number about a transfer message carrying the associated second type of information. In another embodiment according to the invention, the link information can include resource location information that makes the associated second type of information accessible, for example URL.

In one embodiment according to the invention, if the first information service and the second information service are provided through the same carrier, the link information comprises a service ID of an information originator of the second information service, content ID of information provided through the second information service, an application identifier for specifying type of information provided through the second information service, and identifying information of a transfer message carrying the associated second type of information.

In the one embodiment, a frame carried by the received signal is searched for a service component frame preceded by a service component identifier included within the link information, the found service component frame is searched for a transfer message of an identifier specified by message identifying information within the link information, and the transfer message is searched for the second type of information.

In another embodiment according to the invention, the link information comprises a service ID of an information originator of the second information service, content ID of information provided through the second information service, an application identifier for specifying type of information provided through the second information service, and identifying information of a transfer message carrying the associated second type of information. The link information selectively includes a service ID of a carrier providing the second information service and information about a signal bearer of the second information service.

In the another embodiment, the link information is compared with service and network information extracted from a service component frame of a service and network information within a data frame carried by the received signals, a service component identifier assigned to a service component frame carrying contents of the second information service is found through the comparison, and a service component frame, identified by the found service component identifier, within a data frame carried by the received signals is searched for a transfer message containing an identifier indicated by message identifying information within the link information.

In one embodiment according to the invention, the link information is carried by a message management container within the transfer message.

In another embodiment according to the invention, the link information in carried by a link information container at the same level of an application event container. In the present embodiment, the link information within the link information container is organized according to a structure from among structures defined to be used by other information services including the first information service.

In yet another embodiment according to the invention, the link information is included in the transfer message in the level of an application component that constitutes an application event container within the transfer message.

In still another embodiment according to the invention, the link information is included in a component of lower level than that of an application component that constitutes an application event container within the transfer message.

In one embodiment according to the invention, the first type of information is bus service information and the second type of information is service information of a long distance transportation means.

A terminal device receiving information according to the invention comprises a demodulator demodulating received signals and outputting a frame sequence carrying application information, a decoder extracting a transfer message from each frame within the frame sequence and extracting a first type of information and link information from the extracted transfer message, and a controller storing the extracted first type of information in a storage means and outputting the stored information or part of the stored information according to a condition through an output unit. The decoder, based on the link information extracted according to control of the controller, also searches a second information service different from a first information service that services the first type of information for a second type of information associated with the first type of information and delivers the found second type of information to the controller.

In one embodiment according to the invention, the terminal device further comprises a communication unit that can communicate data with a communication network in a wired or wireless fashion. The controller further carries out a function of controlling the communication unit based on the extracted link information and thus obtaining a second type of information associated with the first type of information from a remote site.

Advantageous Effects

At least one embodiment from among embodiments of the invention fully described in the following with reference to appended drawings and the above description of the invention enables a user being allowed for multiple application services and using one service at a particular time to easily check and use information provided by a different application service associated with information obtained from the service without a complicated search procedure, facilitating convenience to use various services and degree of using the services.

BRIEF DESCRIPTION OF THE DRAWINGS

FIG. 3 illustrates a structure of a frame carrying application information and relationship among component frames for service and network information, the component frames being carried by the frame;

FIG. 4 illustrates syntax showing the structure of a component frame for service and network information of FIG. 3;

FIG. 5 illustrates syntax by which information about service table guide is transferred being carried by the SNI component of FIG. 4;

FIG. 6 illustrates information that comprises link information about application information additionally transferred according to one embodiment of the invention;

FIG. 7 illustrates an identifier assigned to each application (AID);

FIG. 8 illustrates syntax of structure of link information for specifying associated information among application information services according to one embodiment of the invention;

FIG. 9 illustrates how link information of FIG. 8 is included in a message management container according to one embodiment of the invention;

FIG. 10 illustrates how various types of link information are contained in a container of the same level as an application event container according to one embodiment of the invention;

FIG. 11 illustrates syntax of an application linking container defined to be used commonly for all types of information services according to one embodiment of the invention;

FIG. 12 illustrates syntax of a component for using all or part of an application link container of FIG. 11 with respect to a particular information service according to one embodiment of the invention;

FIG. 15 illustrates how link information of FIG. 8 is contained in a component at a level lower than that of an application event container according to another embodiment of the invention;

FIG. 16 illustrates information that comprises link information about application information services additionally transferred according to another embodiment of the invention;

FIG. 17 illustrates syntax of link information for specifying associated information among application information services according to another embodiment of the invention;

FIG. 18 illustrates how link information of FIG. 17 is contained in a component at the level of an application event container according to one embodiment of the invention;

FIG. 21 illustrates a structure by which bus service information that is one type of application information received by the terminal of FIG. 20 is stored.

MODE FOR THE INVENTION

Hereinafter, preferred embodiments of the present invention will be described in detail with reference to appended drawings.

Figure 1:
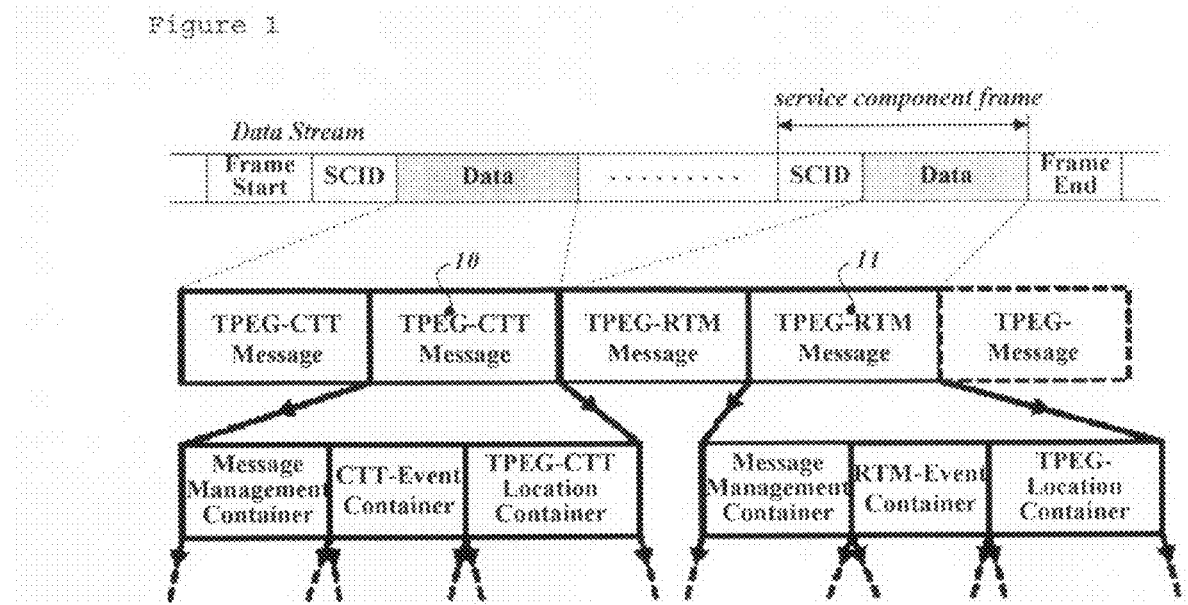
FIG. 1 illustrates a transfer format of application information different from each other provided by the same carrier.
Figure 2:
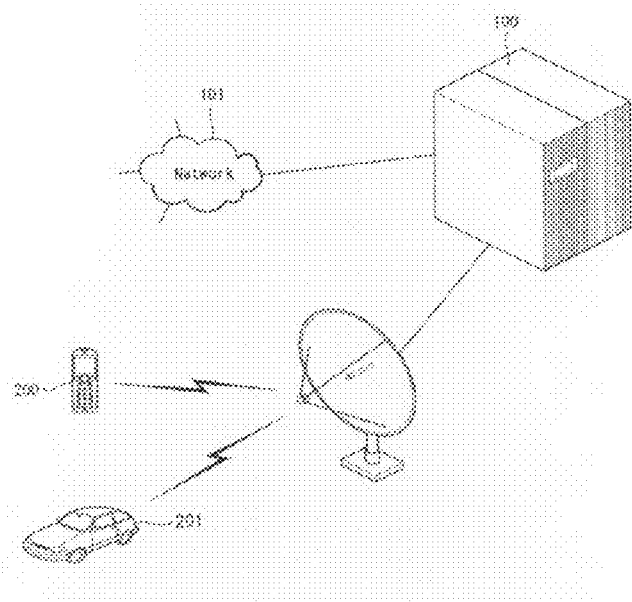
FIG. 2 illustrates a network providing application information and link information among the application information according to the invention.

FIG. 2 illustrates a network providing link information among application information according to the invention. In the network of FIG. 2, an application information providing server 100 in a broadcast station classifies and organizes information about congestion and road situations (e.g., obstacles on the road) collected from various sources (e.g., operator input, information received from another server through a network 101 or probe cars), parking information, service information of a long distance transportation means, and so on with respect to each individual application information and transmits the organized information wirelessly so that a navigation terminal installed in a car 201 or an information terminal 200 carried by the user can receive the information. An information originator that organizes a variety of application information and a carrier that transmits the organized information wirelessly can be different service providers, which are handled separately for the convenience of description of the present invention.

In addition to the aforementioned information, the application information providing server 100 can organize other different application information such as weather information, regional information, and so on associated with traffic conditions. Alternatively, the application information providing server 100 provides congestion and travel time (CTT) information only and a different server can provide the different application information. In this case, the application information providing server 100 can request and receive information required for organizing link information among application information (a service component ID (SCID) assigned to a service component frame carrying each individual application information, an application ID (AID) for specifying type of information in service, a message ID, etc) from other servers. In case the application information providing server 10 also plays a role of a carrier as described below, the application information providing server 100 can obtain the required information from information (a message ID, etc) received from the corresponding servers and information (SCID, etc) created by the application information providing server itself.

As shown in FIG. 3, the application information providing server 100 transmits a data frame including a service component frame 301 of SNI (Service & Network Information) data whose SCID is 0 to provide identifying information about various application information currently provided by the application information provider server itself and/or different servers. The SNI service component frame 301 has a structure of FIG. 4 and comprises more than one SNI component; a component of an identifier 0x01 among the SNI components includes a service table guide organized according to the syntax as shown in FIG. 5. The service table guide, as shown in the figure, comprises multiple guide elements (line_of_table__1) 310 and each guide element 310 comprises a service component ID (SCID), a content ID (COID), and an application ID (AID). If a service ID (SID) 311 of an information originator that organizes and provides information (the SID comprises "SID-A, SID-B, and SID-C") is different from the service ID of a carrier that transmits information, the service ID of the information originator is selectively included. A set (COID, AID, and SID of an information originator) of identifying information included in each guide element 310 can uniquely specify an application information service (hereinafter, it is called "application service" for short). In this way, each guide element 310 delivers information 312 of SCID assigned to a service component frame intended for an application information service.

Meanwhile, each guide element 310 includes a safety flag 313 indicating that a service of the corresponding information originator transfers a safety-related message. The safety flag indicates that a service component frame identified by the corresponding service component ID (SCID) 312 carries only a message used for warning a service user about an anticipated problem on the road, for example slipperiness on the road surface. Therefore, a service component frame having SCID within a guide element to which the safety flag is set is extracted promptly from the data frame of FIG. 3 and notified to the user.

SCID is used to specify service component frames for an application information service within service signals provided by a single carrier; as time passes, the same value of SCID can also be used for service component frames for a different application information service. In this case, since values of a set (COID, AID, and SID of an information originator) of identifying information within a service table guide organized and transferred as shown in FIG. 5 are changed accordingly, a terminal can know SCID assigned to an application information service that the terminal is going to provide from information contained in an SNI component.

In case of an application information service transferred through a different carrier, the terminal can know SCID assigned to an application information service that the terminal is going to provide from information of an SNI component organized as shown in FIG. 5 that is transferred through signals for the service.

When the application information providing server 100, while providing a certain application information, determines to associate particular information of the application information with particular information provided as a different application information service, the application information providing server 100 receives information for association input according to the request of the operator, creates link information for currently provided application information, and includes the link information in the currently provided application information.

For example, while application information for bus service information (BSI) is being created, if a particular bus stop corresponding to a bus stop ID creating service information of current related service routes is the one close to a terminal or an airport where long distance transportation means (express buses, airplanes, etc) are provided, information that can specify a PTI service providing information about service hours of transportation means that are provided by the terminal or airport and identifying information of a message (MID: Message ID) in which service information associated with the PTI service is included are added together to the application information for a bus information service as link information. The above description is only an example devised for the purpose of understanding; in addition to the above example, various information (for example, a particular link of the road in a congestion information service and parking information at a particular area in a parking information service can be associated with each other) related to each other among application information services can also be utilized. Since various application information not described in this document can be utilized immediately by those skilled in the art without modification of the invention, those inventions applied to associated information not specified or described in the document should be considered to belong to the scope of the invention.

FIG. 6 illustrates information that comprises link information about application information services additionally transferred according to one embodiment of the invention. To describe the example of illustrated information, if a particular bus stop of a stop ID 401 corresponding to arrival information of a bus carried by an arbitrary message 420 for a current BSI service is the one close to a terminal or an airport where long distance transportation means are provided, to specify information about PTI service that provides information about service hours of transportation means available at the terminal, station, or airport, an application ID (AID) assigned to information type of PTI, SCID 411 assigned to a service component frame carrying PTI data, and identifying information of a transfer message (TPEG message) (MID: Message ID) 412 to which associated service information from a message sequence for the PTI service is contained are created as link information and loaded into a message 420 carrying the BSI information. In another embodiment of the invention, application ID may not be included in link information. FIG. 7 illustrates AID assigned to each application; information of the illustrated list is either defined commonly for terminals or applied to programs according to the definition.

FIG. 8 illustrates a structure of link information created by the above method. In one embodiment according to the invention, the application information providing server 100 loads link information organized as above into a message management container (421 in the example of FIG. 6) including information about creation time and the like within a succeeding container, the container located at the head of an application event container carrying particular information requiring associated information. For this purpose, a message management container employs the syntax as shown in FIG. 9 and records link information in a connection information field 601 composed of four bytes (intunlo: integer unsigned long). In the present embodiment, only the lower one byte of AID defined by two bytes (intunli: integer unsigned little) in FIG. 8 is recorded in the connection information field 601 together with SCID of one byte (intunti: integer unsigned tiny) and MID of two bytes. This is possible because types of application information is less than or equal to 255 as shown in FIG. 7 and thus information loss does not occur even if only one byte of AID is employed. However, if the number of types of application information exceeds 255, other reserved fields of a message management container can be used. Although the structure of a message management container of FIG. 9 for carrying link information is related to BSI service, for the case of loading link information to a different application information service, it is evident that a structure slightly different from that illustrated in FIG. 9 can also be employed for a message management container of the application information service to accommodate the link information.

In another embodiment of the invention, the application information providing server 100, in addition to the link information organized as shown in FIG. 8, loads various types of link information at the same level of an application event container. FIG. 10 illustrates an example of a transfer message (TPEG message) organized according the reto. An application linking container for transfer of link information, loaded at the same level of an application event container has structure defined independently of the corresponding application service. In other words, an application linking container for transfer of link information is not defined only for a single application service but defined to have a flexible structure that all the application services can use; the corresponding application service specifies and uses an appropriate structure or a lower level structure from the application linking container defined as above. FIG. 11 illustrates syntax of an application linking container defined and used according to the present embodiment. The syntax of FIG. 11 illustrates only very limited portion of various types of link information for linking messages belonging to different application services. Therefore, it should be understood that the scope of the invention is not limited by the type of link information suggested in the figure; as shown in FIG. 11, those inventions attempting to use all or part of the structure of a link information container defined independently of a particular application for various application services should be considered to belong to the scope of the present invention.

FIG. 10 is intended to illustrate that different types of link information (741 of FIG. 10 according to 751 of FIG. 11, 741 of FIG. 10 according to 752 of FIG. 11, 743 of FIG. 10 according to 753 of FIG. 11) can be transferred as a link information component (linking_info_component) belonging to a link information container varies the corresponding identifier, not necessarily implying transfer of multiple link information components. In case only one message is to be linked, a structure of a link information component most relevant to specify the message is selected and included in a transfer message; when the contents of multiple transfer messages are to be linked to a single transfer message, relevant types of multiple link information components can necessarily be included. Version number recorded in a second type of a link information component 742, 752 illustrated in FIGS. 10 and 11 is a number assigned to each transfer message. For example, for a message transferring information about a particular location, a version number is required to specify a transfer message uniquely along with a message identifier if the message identifier is fixed but the corresponding version number is updated. Information included in a third type of link information component 743, 753 where the corresponding syntax is illustrated in FIG. 11 is described fully in the description about the embodiments below. Various types of link information components in addition to the type illustrated in the figure can be defined. For example, another type of a link information component can include information located at a particular server through a communication network, for example resource location information used to access a file or a message, namely URL (Uniform Resource Locator).

As shown in FIG. 11, to use a link information container of a structure independent and common to all the application services for a message of a particular application service, a component is organized according to the syntax as shown in FIG. 12. That is to say, a component identifier (identifier 'MM' of FIGS. 10 and 12) indicating employment of all or part of a structure defined for a link information container is assigned to a component for the corresponding application service and information of the component is organized to be suitable for the structure of a link information container. As for an application component (linked message reference component: 730 of FIG. 10 organized according to the syntax of FIG. 12) for transferring information according to the structure of a link information container, a single value separated from consecutive identifiers used to distinguish components transferred for the corresponding application services according to the respective types can be used. If identifiers, for example ranging from 0x80 to 0x88 have been assigned to components carrying information about application events, an identifier of 0xA0 or 0xB0 is assigned to a linked message reference component 730 carrying link information according to a structure of a link information container.

Figure 13:
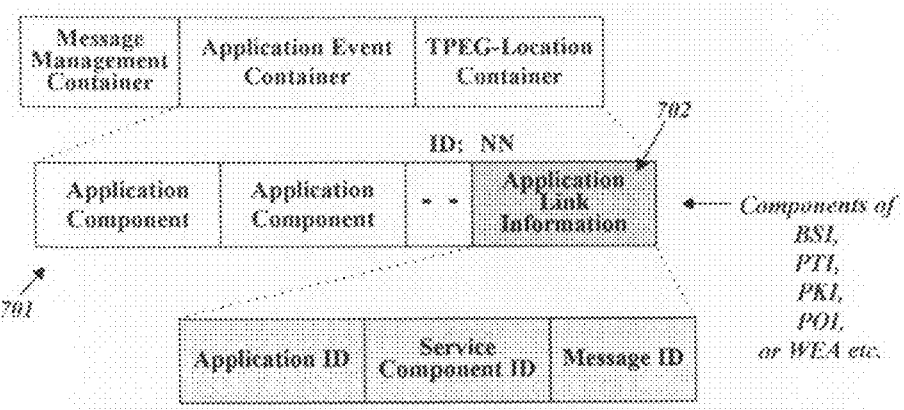
FIG. 13 illustrates how link information is contained in a component at the level of an application event container according to another embodiment of the invention.
Figure 14:
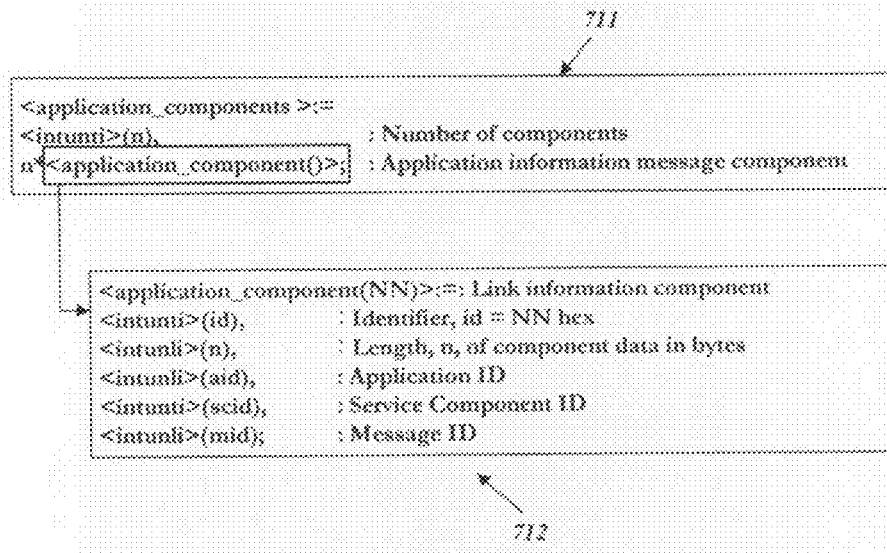
FIG. 14 illustrates syntax for a component that carries link information and belongs to an application event container according to one embodiment of the invention.

In another embodiment according to the invention, the application information providing server 100 loads link information organized as shown in FIG. 8 at the component level of an application event container. FIG. 13 illustrates an example of a transfer message (TPEG message) organized according thereto. As the syntax is illustrated in FIG. 14, loading at the component level of an application event container implies that link information is loaded into one (702 of FIG. 13 organized according to 712 of FIG. 14) of components (701 of FIG. 13 according to 711 of FIG. 14) to comprise an application event container. In this case, according to the syntax of FIG. 14, added to the head is an identifier (identifier 'NN' of FIG. 14) for identifying a link information component to which the link information is loaded. The identifier added in this case can be one of consecutive identifiers used for identifying components transferred for the corresponding application service according to the respective types. Since a component for transferring link information is defined and used only for a particular application service in the present embodiment, the employed structure of the component can be different from that of a component for transferring link information that a different application service has selected.

In another embodiment according to the invention, the application information providing server 100 makes link information organized as shown in FIG. 8 accompany a component located at a level in the hierarchy lower than the component level of an application event container and loads the link information at the same level of the component. FIG. 15 illustrates an example of a TPEG message organized according thereto, which is based on the BSI service illustrated in FIG. 6. Although not shown in the figure, at this time, too, since the link information is transferred in the form of a component, an identifier for indicating a link information component is added to the head. The present embodiment is suitable for specifying information associated with particular information within a TPEG message. On the contrary, embodiments of FIGS. 9 and 13 are suitable for specifying information associated with the entire TPEG message. The above description, however, is not limited to the case of specifying information associated with the entire TPEG message, which can also be applied to the case of specifying information associated with part of the TPEG message.

Each individual embodiment described with reference to FIGS. 9, 10, 13, and 15 is not exclusive of each other but can be used in combination if required. For example, in case of specifying information associated with the entire TPEG message, embodiments of FIGS. 9, 10, and 13 are used; in case of specifying information associated with part of particular information within a TPEG message, the embodiment of FIG. 15 can be used.

As mentioned above, the value of SCID assigned to each service component frame can be changed to specify different application information as time passes. In this case, as shown in FIG. 8, if SCID is used as link information, a terminal may either have difficulty to find relevant information or recognize wrong information as associated information. Therefore, in this case, instead of SCID, SID of an information originator and content ID (COID) are used for link information along with AID and MID. Also, as shown in FIG. 16, if associated information is included in an application information service transmitted by a carrier different from the carrier transmitting a currently provided application information service, SID of an information originator and content ID alone cannot specify the corresponding associated application information service. Therefore, according to whether associated information is transmitted by the same carrier, link information additionally includes SID 801 of a carrier transmitting a different application information service. When a carrier is changed, the corresponding signal bearer can be changed accordingly. The signal bearer in this context implies carrier frequency within the same signal system service (e.g., DMB: Digital Multimedia Broadcast) while, for the case of a different signal system service, the signal bearer becomes connection information (e.g., URL when a signal system is Internet) which enables to use the service. Therefore, the link information selectively includes information about a signal bearer.

FIG. 17 illustrates syntax for organizing link information according thereto. The organization of the link information is the same as the organization of a link information component 743, 753 in one embodiment described with reference to FIGS. 10 and 11, where various types of link information is defined as part of structures of a component that can be carried by an application linking container and the link information can be transferred through a relevant structure from among the structures. As shown in FIG. 17, link information according to the present embodiment comprises ID 901 of an information originator, content ID 902, and application ID 903; SID 905 of a carrier and bearer information 906 are included selectively according to the value of a selector. A field (<bearer_linkage_info>) to which the bearer information is written includes an identifier specifying the format of bearer information and according to the value of the identifier, a value indicating frequency or a character string indicating URL is included. Since the link information is transferred in the form of a component, the link information has an identifier 911 and the value of the identifier is properly selected according to an applied component level.

In one embodiment according to the invention, the application information providing server 100 loads link information organized as shown in FIG. 17 into a component of a component level of an application event container. FIG. 18 illustrates one example of a transfer message (TPEG message) organized according thereto.

In another embodiment according to the invention, link information can be loaded at the same level as an application event container as described above. That is to say, by adopting one type 753 of a link information component (a link information component of an identifier 02) defined as a component of an application linking container, the same information as link information transferred according to FIG. 18.

Figure 19:
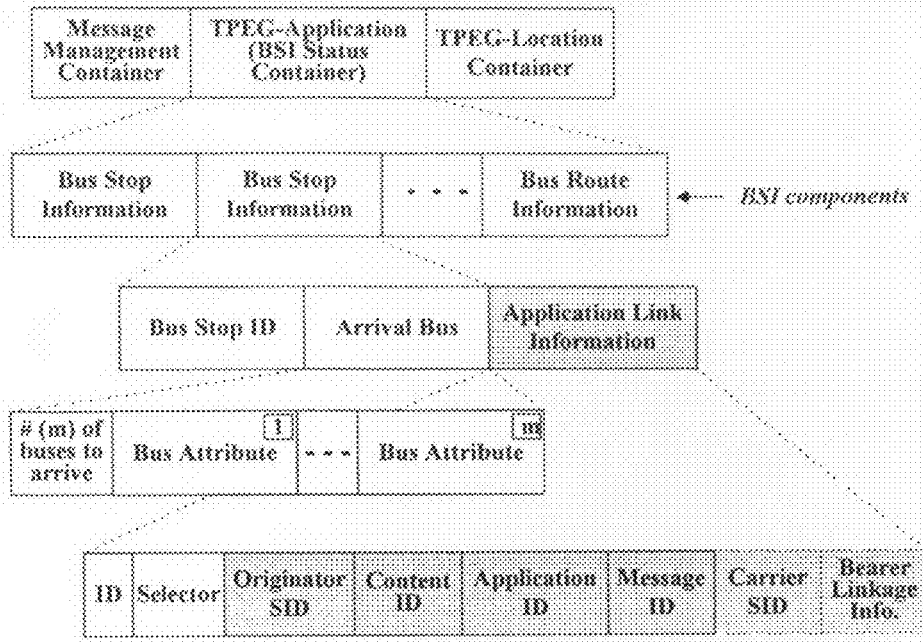
FIG. 19 illustrates how link information of FIG. 17 is contained in a component at a level lower than that of an application event container according to one embodiment of the invention.

In another embodiment according to the invention, the application information providing server 100 makes link information organized as shown in FIG. 8 accompany a component at a level lower than the component level of an application event container and loads the link information at the same level of the component. FIG. 19 illustrates an example of a TPEG message organized according thereto, which is based on the BSI service illustrated in FIG. 6. The present embodiment is suitable for specifying information associated with particular information within a TPEG message. On the contrary, embodiment of FIG. 18 is suitable for specifying information associated with the entire TPEG message. The above description, however, is not limited to the case of specifying information associated with the entire TPEG message, which can also be applied to the case of specifying information associated with part of the TPEG message.

The two embodiments described with reference to FIGS. 18 and 19 are not exclusive of each other but can be used in combination for a single application information service if required. For example, in case of specifying information associated with the entire TPEG message at an application information service, embodiment of FIG. 18 is used; in case of specifying information associated with part of particular information within a TPEG message, the embodiment of FIG. 19 can be used.

In organizing a transfer message to provide an application information service, if information associated with the entire transfer message or partial information within the transfer message is provided by a different application information service, in case the different application information service is provided through the same carrier as for a currently provided application information service and SCID is used without alteration, the application information providing server 100 organizes and transfers link information for specifying information associated by one method of FIG. 9, 10, 13, or 15 or by a combined method thereof; in case the different application information service is provided through a different carrier from the case of a currently provided application information service or the different application information service is provided through the same carrier but SCID is used with alteration, the application information providing server 100 organizes and transfers link information for specifying information associated by one method of FIG. 10, 18, or 19 or by a combined method thereof.

Figure 20:
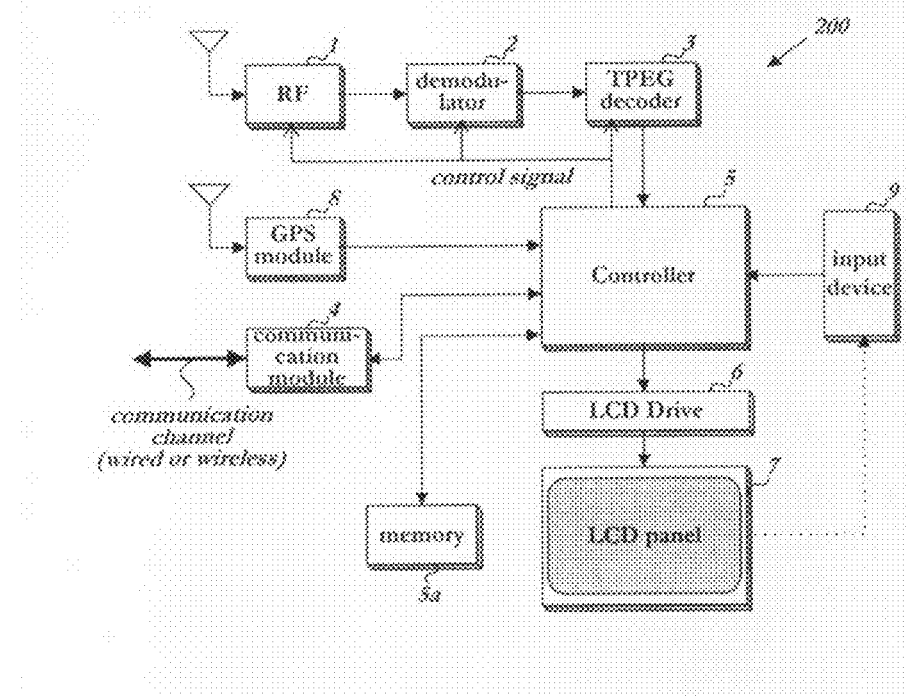
FIG. 20 illustrates a block diagram of a portable terminal or a terminal installed in a car that receives application information transmitted from an application information providing server according to one embodiment of the present invention.

FIG. 20 illustrates a block diagram of a terminal according to one embodiment of the invention that receives application information from the application information providing server 100 organized as described above. The terminal 200 of FIG. 20 comprises a tuner 1 resonating at the required frequency band of a specified application information service and subsequently outputting modulated application information signals, a demodulator 2 outputting application information signals by demodulating the application information signals in a way relevant to the modulated application information signals, a TPEG decoder 3 acquiring application information by decoding the modulated application information signals, a GPS module 8 for calculating a current position (i.e., latitude, longitude, and altitude) by receiving signals from a plurality of satellites, a communication module 4 for transmitting and receiving data to and from the exterior through a wired or wireless communication channel, memory 5A 9 containing various graphic information and storing required information temporarily, an input device 9 receiving the user's input, a controller 5 controlling screen display based on the user's input, current location, and acquired application information, an LCD panel 7 for video display and an LCD drive 6 feeding driving signals to the LCD panel 7 according to graphic data for display. The input device 9 can be a touch screen equipped on the LCD panel 7. The terminal 200 can be further equipped with non-volatile memory containing an electronic map in addition to the memory 4.

The tuner 1 resonates signals that the application information providing server 100 (or a carrier that receives and transmits application information organized by the application information providing server 100) transmits according to control signals of the controller 5 and the demodulator 2 demodulates resonated signals and outputs the demodulated signals according to a method specified by the controller 5. The TPEG decoder 3, then, first decodes input demodulated signals into data frames as shown in FIG. 3 and extracts data of a service component frame whose SCID is specified by 00. From the extracted data, a service table guide is constructed by extracting guide elements of a service table organized as shown in FIG. 5 and by searching the service table guide, the value of SCID field 312 is checked, the value of SCID being stored together with the value of AID (COID can also be additionally specified) corresponding to an application service specified by the controller 5. When SCID value is identified, the TPEG decoder 3 extracts a service component frame from a data frame such as shown in FIG. 3, where the identified SCID is located at the head of the service component frame and secondly decodes application information received being carried by the service component frame and delivers the decoded information to the controller 5. For example, if the user requests BSI service from the terminal 200 and accordingly, the controller 5 feeds a value of "000A" to the TPEG decoder 3 according to the content defined in FIG. 7, the TPEG decoder 3, from the service table guide that the TPEG decoder 3 has constructed, reads the value of SCID field stored together with a guide element in a service table to which the value of "000A" is stored and decodes data within a service component frame, at the head of which the SCID value is located, and provides the decoded data to the controller 5.

Instead of the TPEG decoder 3's selecting an application service, decoding information provided by the service, and delivering the decoded information to the controller 5, the TPEG decoder 3 can decode information of all the application services included in the constructed service table guide by using internal decoding modules (or program routines) corresponding to the services and deliver each decoded information to the controller 5.

In what follows, descriptions are given under the assumption that the user selects BSI service from among various application services. Even if the user selects a different application service, the same method described below can be directly applied to the application service; therefore, the scope of the invention is not limited to the example of an application service described in the following embodiment.

The controller 6 organizes a decoded information table with the structure as shown in FIG. 21 in the memory from decoded BSI data received from the TPEG decoder 3. FIG. 21 is a simple example of data storage structure, where a bus route ID, ID of a bus stop belonging to the bus route, estimated time 1201 between bus stops of each bus route, current location of a bus 1202, and link information 1203 are received and stored; all of the above information is assumed to have been provided from TPEG-BSI message. It is apparent that a storage table illustrated in FIG. 21 can further include information elements not shown in the figure (e.g., type of a service route, bus service company name, time of a first and last bus, bus fare, coordinate information of a bus stop, etc) and information decoded with a different structure from FIG. 21 can also be stored. Since the purpose of the invention lies in link information for associated information provided from different application services rather than information provided from a single application service, specific description about acquisition of information provided from an individual application service and the content thereof are not provided.

In the information table illustrated in FIG. 21, a column 1201 of estimated time for a link of each service route contains the information constructed by decoding estimated time information for each link transferred by an estimated time component for each link within a BSI message; a column 1202 of current bus location information of each service route is constructed by information decoded from, for example a bus location component. A link information column 1203 contains information constructed by link information carried by a message management container (the embodiment of FIG. 9) within BSI message, a component belonging to an application linking container (embodiments according to FIGS. 10 through 12), a BSI component (the embodiment of FIG. 13 or 18) or a component at the level lower than that of the BSI component (embodiment of FIG. 16 or 19). Link information stored in the information table illustrated in FIG. 21 can be one type of link information from among various types 751, 752, 753 illustrated respectively in FIG. 11.

The controller 5 marks Yes (1) on a bus stop for which link information has been received and stores the received link information in the corresponding field. As for bus stops for which link information has not been received, No (0) is marked. In other words, in the example of a link information column 1203 of FIG. 21, received link information (Link_Inf_1) is also stored in the fields where Yes (1) is marked.

Meanwhile, in the column of current bus location information 1202, the value of 1 (which corresponds to Yes) is set when it is decoded that a bus in service is at the corresponding bus stop; the value of 2 (which corresponds to preceding section) is set when it is decoded that a bus is located within a link where the bus stop is a destination. Namely, in the example of FIG. 21, when an identifier (or a pair of bus stop IDs of 'Mikeum station' and 'Korea Telecom') about a link where a start position is 'Mikeum station' and a destination is 'Korea Telecom' has been received as location information of a bus in service, a value of 2 is set for the bus stop of 'Korea Telecom'.

The controller 5 updates bus service information stored in the structure of FIG. 21 whenever new information is received from the application information providing server 100. The controller 6, instead of storing all the data received from the TPEG decoder 3 in the memory, can selectively store data close to a current location identified by the GPS module 8, for example those data about bus stops within a radius of 1 km.

Figure 22:
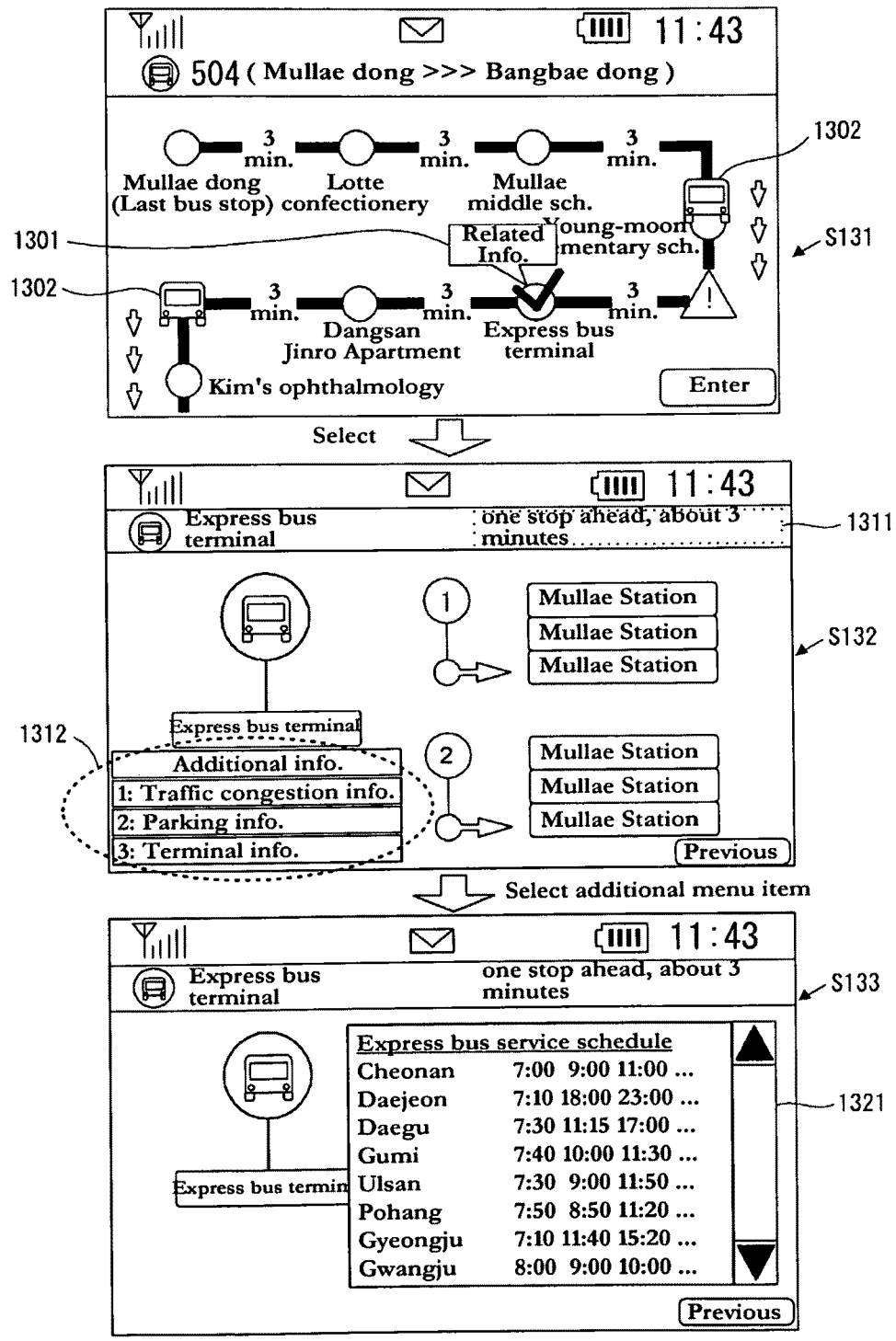
FIG. 22 illustrates a procedure of displaying associated information on a screen by using link information according to the request of the user.

Under the condition that received public transportation information is stored as above, when the user requests 'public transportation information' through the input device 9, the controller 5 displays a menu related to public transportation information that the user can select on the LCD panel 7. If the user inputs a service route number through a relevant UI from the displayed menu, the controller 5 searches the memory, obtains information about each bus stop stored as in FIG. 21 with respect to the corresponding service route number, and displays bus stop names on the screen along with service route ID and service route information as shown in FIG. 22 S131. Also, the controller 5 reads link estimation time between bus stops from the corresponding column 1201 of the information table of FIG. 21 and displays the read estimated time on the corresponding link between the bus stops on the screen. At this time, as for a bus stop where Yes is marked at the link information column 1203 of the information table of FIG. 21, an additional mark 1301 is added at the corresponding bus stop to indicate existence of associated information.

At the same time of the user's request or display S131 of bus stop names, by reading information about a current location of a bus in the corresponding service route from the current location column 1202 of the information table of FIG. 21 and displaying the read information at the corresponding position on the screen as a particular mark 1302, the current location of a bus on a selected service route is informed for the user.

On a service route displayed on the screen, if the user selects a bus stop by utilizing arrow keys equipped in the input device 9, the controller 5 displays various information received with respect to the bus stop, for example estimated arrival time 1311 of the corresponding service route and information about each service route that passes the bus stop on the screen and if there exists link information about the selected bus stop, the link information is displayed together S132. In displaying link information, AID of the corresponding bus stop within link information is checked and a name corresponding to the AID is displayed. For example, according to FIG. 7, if AID is "0004", it is displayed as traffic congestion information. In case of "0003", it is displayed as parking information while it is terminal information for the case of "0002". Also, the number of link information about a single bus stop can be more than one. Therefore, the controller 5 lists up link information sequentially as an additional menu as many as the number of existing link information.

If the user selects an item from an additional menu 1312, the controller 5 checks the content of a transfer message (TPEG message) of the corresponding application service from link information corresponding to the item; the procedure is carried out as follows.

If received link information is stored in a link information column 1203 of the table of FIG. 21 organized as shown in FIG. 7, the controller 5 feeds SCID and MID (along with a version number if a version number is included in link information) within the link information to the TPEG decoder 3 and requests decoding of a TPEG message that has the value of fed MID (or MID and a version number) from the data within a service component frame corresponding to the SCID. According to the request, the corresponding TPEG message is decoded and the decoded information is delivered to the controller 5. If the TPEG decoder 3 decodes transfer messages of all the application services within signals provided through a carrier and transfers the decoded information to the controller 5 along with SCID of a service component frame to which each message has been belonging, the controller 5, instead of making a request on the TPEG decoder 3 as above, checks information decoded from a TPEG message corresponding to SCID and MID (or SCID, MID, and a version number) of link information about the selected item within the memory.

The controller 5 allows the user to see the information transferred from the TPEG decoder 3 or checked from the memory, for example service information of a long distance transportation means by displaying the information in a separate window 1321, S133. Service information of a long distance transportation means displayed as above can include information associated with other bus stops not required by the user, for example train service information associated with a bus stop 'Seoul station'. The aforementioned situation can happen when link information is received by the same level of an application event container (that is, through an application linking container) or by the component level of an application event container or being carried by a message management container as described above rather than being transferred by a component of lower level through which information about an individual bus stop is transferred. This is because link information can specify information associated with the entire application information (for example, information of arrived buses about multiple bus stops) carried by the TPEG application container. In this case, therefore, the user checks desired information by scrolling displayed additional information through an appropriate input key, namely the content of a service information display window 1321 for a long distance transportation means in the previous example. In other words, as illustrated in FIG. 22, the user can check a time table of express bus service relevant to a bus stop 'express bus terminal' that he or she has selected. Accordingly, the user can easily check associated information provided by a different application service while the user is enjoying an application service.

If link information is received being organized as in FIG. 17 or received through a third type of a link information component 743 of an application linking container according to the embodiments of FIGS. 10 and 11; and the received link information is stored (as a matter of course, the value of a component identifier is not stored), it is checked whether SID of an carrier is included. If SID is found not included, information originator SID, content ID, application ID, and message ID are fed into the TPEG decoder 3. The TPEG decoder 3 then searches a service table guide acquired from a service component frame of SCID 0 within a frame sequence being currently received for a guide element where information originator SID, content ID, and application ID received from the controller 5 are identical. At this time, if there is no SID for a guide element, carrier SID 431 decoded from a frame header as shown in FIG. 6 is employed and compared for the element.

If a guide element is found where the three IDs are the same, the value of SCID field 312 within the element is read and a TPEG message is decoded, the TPEG message having the value of a message ID received previously within the data of a service component frame, at the head of which the SCID value is located or if the TPEG message has already been decoded, the decoded information is transferred to the controller 5. A procedure of the controller's 5 providing the transferred content for the user is the same as described above.

If link information is received being organized as shown in FIG. 17 or received through a third type of a link information component 743 of an application linking container according to the embodiments of FIGS. 10 and 11 and SID of a carrier and signal bearer information are included, the controller 5 first checks a signal format to apply from signal bearer information and controls the tuner 1 and a demodulator 2 to receive and demodulate signals in a way appropriate to the signal format. As a matter of course, instead of controlling the tuner 1 and demodulator 2, by activating a different receiving means (not shown) installed previously, signal reception (or connection) through a specified signal format can be carried out. After the control or activation of a different receiving means, the controller 5 feeds SID of the carrier, information originator SID, content ID, application ID, and message ID to the TPEG decoder 3. The TPEG decoder 3 then extracts a frame sequence where the carrier SID is located at the head thereof from the data demodulated from the demodulator 2 and from the frame sequence, carries out first-order extraction of service component data where SCID is specified as 00. From the data extracted as above, guide elements of a service table organized as shown in FIG. 5 are extracted and a service table guide is constructed. The service table guide is then searched for a guide element where information originator SID, content ID, and application ID fed from the controller 5 are identical. At this time, if there is no information originator SID for a guide element, the received carrier SID is employed and compared for the element.

If a guide element is found where the three IDs are the same, the value of SCID field 312 within the element is read and second-order extraction of data within a service component frame is carried out, at the head of which the SCID value is located. From the extracted data, a TPEG message having the value of a message ID received previously is decoded and the decoded information is transferred to the controller 5. A procedure of the controller's 5 providing the transferred content for the user is the same as described above.

In another embodiment according to the invention, a message specified by the link information can be a message or information that can be accessed through a communication network such as wired or wireless Internet or a mobile communication network of CDMA, or GSM rather than through broadcasting signals. At this time, the controller 5 extracts access location information, for example URL from the link information and orders access while transferring the extracted access location information to the communication module 4. According to the order, the communication module 4 carries out a procedure of transferring the received access location information to a wired or a wireless communication network according to a required communication protocol, receiving a response from a server carrying the corresponding information, and downloading a file or a message. During the procedure, if private information, permission, or authentication of the user is required, the controller 5 can provide a required UI, receive required information from the user through the provided UI, and provide the required information for the server through the communication module 4. Through the above procedure, data of a message or a file corresponding to resources specified by the access location information are received or downloaded and then provided for the controller 5. A procedure of the controller's 5 providing the transferred content for the user is the same as described above. At this time, if required, the transferred content can be provided for the user after the transferred content is decoded according to a relevant method and required information is acquired.

Meanwhile, a terminal, the organization of which has been illustrated in FIG. 20 can be an independent product or can be a constituent unit of a composite product having different functions. For example, FIG. 20 can be an independent navigation terminal or part of a mobile phone, PDA, portable multimedia player, or other telematics terminals. When the terminal is used as a constituent unit of a composite product, a procedure of acquiring application information of a particular service described above and/or application information associate with each other is carried out upon mode selection of the user.

The foregoing description of a preferred embodiment of the present invention has been presented for purposes of illustration. Thus, those skilled in the art may utilize the invention and various embodiments with improvements, modifications, substitutions, or additions within the spirit and scope of the invention as defined by the following appended claims.

The invention claimed is:

1. A method for processing traffic information, at a server including an encoder and a transmitter, comprising:
encoding, at the encoder, the traffic information; and
transferring, at the transmitter, encoded traffic information,
wherein the traffic information includes a first component frame, a second component frame, a first service component identifier assigned to the first component frame, and a second service component identifier assigned to the second component frame,
wherein the first component frame includes a first information to be provided through a first message, the first message includes a first message management container, a first event container, and a first location container,
wherein the second component frame includes a second information to be provided through a second message, the second message includes a second message management container, a second event container, and a second location container,
wherein the traffic information further includes a linkage information identifying the second information associated with the first information,
wherein the linkage information includes a carrier service ID identifying a service of a carrier providing the second information, an originator service ID identifying a service of an originator generating the second information, a content ID identifying the second information, an application ID corresponding to a type of the second information, and a bearer information about a signal bearer for the second message,
wherein the bearer information includes a bearer information identifier specifying a format of the bearer information, and
wherein the bearer information further includes a value indicating frequency or a character string indicating a Uniform Resource Locator (URL) according to a value of the bearer information identifier.

2. The method of claim 1, wherein the first information is one from among road situation information including road obstacles, service information of a long distance transportation means, parking information, road congestion information, weather information, bus service information, regional information, and news information.

3. The method of claim 2, wherein the second information is one from among road situation information including road obstacles, service information of a long distance transportation means, parking information, road congestion information, weather information, bus service information, regional information, and news information and the second information is different from the first information.

4. A method for processing traffic information, at a terminal including a receiver and a decoder, comprising:
receiving, at the receiver, the traffic information; and
decoding, at the decoder, received traffic information,
wherein the traffic information includes a first component frame, a second component frame, a first service component identifier assigned to the first component frame, and a second service component identifier assigned to the second component frame,
wherein the first component frame includes a first information to be provided through a first message, the first message includes a first message management container, a first event container, and a first location container,
wherein the second component frame includes a second information to be provided through a second message, the second message includes a second message management container, a second event container, and a second location container,
wherein the traffic information further includes a linkage information identifying the second information associated with the first information,
wherein the linkage information includes a carrier service ID identifying a service of a carrier providing the second information, an originator service ID identifying a service of an originator generating the second information, a content ID identifying the second information, an application ID corresponding to a type of the second information, and a bearer information about a signal bearer for the second message,
wherein the bearer information includes a bearer information identifier specifying a format of the bearer information, and
wherein the bearer information further includes a value indicating frequency or a character string indicating Uniform Resource Locator (URL) according to a value of the bearer information identifier.

5. The method of claim 4, wherein the first information is one from among road situation information including road obstacles, service information of a long distance transportation means, parking information, road congestion information, weather information, bus service information, regional information, and news information.

6. The method of claim 5, wherein the second information is one from among road situation information including road obstacles, service information of a long distance transportation means, parking information, road congestion information, weather information, bus service information, regional information, and news information and the second information is different from the first information.

7. The method of claim 4, further comprising providing a user with information notifying the user of existence of information associated with the first information or part thereof in case that providing the first information or part thereof for the user.

8. An apparatus for processing traffic information, comprising:
an encoder configured to encode the traffic information; and
a transmitter configured to transmit encoded traffic information,
wherein the traffic information including a first component frame, a second component frame, a first service component identifier assigned to the first component frame, and a second service component identifier assigned to the second component frame,
wherein the first component frame includes a first information to be provided through a first message, the first message includes a first message management container, a first event container, and a first location container,
wherein the second component frame includes a second information to be provided through a second message, the second message includes a second message management container, a second event container, and a second location container, wherein the traffic information further includes a linkage information identifying the second information associated with the first information, and wherein the linkage information includes a carrier service ID identifying a service of carrier providing the second information, an originator service ID identifying a service of an originator generating the second information, a content ID identifying the second information, an application ID corresponding to a type of the second information and a bearer information about a signal bearer for the second message, wherein the bearer information includes a bearer information identifier specifying a format of the bearer information, wherein the bearer information further includes a value indicating frequency or a character string indicating a Uniform Resource Locator (URL) according to a value of the bearer information identifier.

9. A apparatus for processing traffic information, comprising:
- a receiver configured to receive the traffic information; and
- a decoder configured to decode received traffic information, wherein the traffic information including a first component frame, a second component frame, a first service component identifier assigned to the first component frame, and a second service component identifier assigned to the second component frame, wherein the first component frame includes a first information to be provided through a first message, the first message includes a first message management container, a first event container, and a first location container, wherein the second component frame includes a second information to be provided through a second message, the second message includes a second message management container, a second event container, and a second location container, wherein the traffic information further includes a linkage information identifying the second information associated with the first information, and wherein the linkage information includes a carrier service ID identifying a service of a carrier providing the second information, an originator service ID identifying a service of an originator generating the second information, a content ID identifying the second information, an application ID corresponding to a type of the second information and a bearer information about a signal bearer for the second message, wherein the bearer information includes a bearer information identifier specifying a format of the bearer information, wherein the bearer information further includes a value indicating frequency or a character string indicating Uniform Resource Locator (URL) according to the value of the bearer information identifier.

* * * * *